United States Patent Office 3,118,903
Patented Jan. 21, 1964

3,118,903
2-OXO-1,2,3,5-OXATHIADIAZOLES AND METHODS FOR PREPARING THE SAME
Edward E. Schmitt, South Norwalk, Conn., assignor to American Cyanamid Company, Stamford, Conn., a corporation of Maine
No Drawing. Filed Mar. 30, 1962, Ser. No. 183,718
9 Claims. (Cl. 260—306.7)

The present invention relates to novel 2-oxo-3,4-di-substituted 1,2,3,5-oxathiadiazoles and to methods for their preparation. More particularly, it relates to the preparation of certain 2-oxo-1,2,3,5 - oxathiadiazoles, wherein the 3 and 4 positions on said oxathiadiazoles are substituted by either aliphatic or aromatic substituents.

The oxo-1,2,3,5-oxathiadiazoles of the present invention find utility in agricultural applications, particularly as active ingredients in fungicidal compositions.

In general, the oxathiadiazoles of the present invention can be conveniently prepared by the reaction between a mononitrile oxide and a thionyl amine according to the equation:

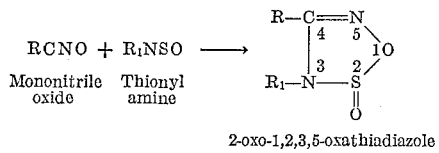

2-oxo-1,2,3,5-oxathiadiazole wherein R and $R_1$ each represent an alkyl radical from 1 to 18 carbon atoms or an aromatic substituent, such as phenyl, naphthyl or halophenyl, the halo radical being fluorine, chlorine, bromine or iodine.

Advantageously, the thionyl amine and mononitrile oxide are reacted in approximately equimolar proportions. However, if desired, the reaction can be carried out with an excess, up to about 10% mol excess, of either reactant. The reactants are generally admixed in a suitable inert solvent, such as for instance ether or dimethyl formamide. Reaction occurs at temperatures below the boiling point of the solvent and usually between about 0° C. and about 100° C. Resultant 2-oxo-1,2,3,5-oxathiadiazole derivative is thereafter recovered.

It has been found that the reaction proceeds smoothly by forming the mononitrile oxide in situ during reaction. Accordingly, the corresponding chloro-oxime precursor of the mononitrile oxide can be employed. Admixing the latter precursor, namely, the aromatic chloro-oxime, with the desired thionyl amine, in the presence of a strong base which is introduced so as to release an aromatic mononitrile oxide, 2-oxo-1,2,3,5-oxathiadiazoles are recovered. Thus, the use of a strong base, such as trialkyl amine, as exemplified by trimethyl amine or triethyl amine, or an alkali metal hydroxide, such as sodium hydroxide or potassium hydroxide, is a prime requirement. Alternatively, mononitrile oxides can be prepared by converting either an aliphatic nitro compound or an aralkyl nitro compound in the presence of the aforementioned strong base and phenyl isocyanate.

Illustrative oximes from which the chloro-oximes and subsequent aromatic mononitrile oxides are prepared, are: benzal oxime, p-chlorobenzal oxime, o-bromobenzal oxime, p-iodobenzal oxime and naphthaldehyde oxime. Exemplary aliphatic nitro compounds are: nitroethane, nitropropane, nitrodecane, nitrododecane and phenyl nitromethane. It is, therefore, within the purview of this description to employ the mononitrile oxide reactant prepared by any process known.

In the process of the invention, a wide variety of thionyl amines can be utilized. These are, for instance: thionyl aniline, thionyl naphthyl amine, thionyl butyl amine, thionyl propyl amine, thionyl dodecyl amine and thionyl stearyl amine.

In order to facilitate a further understanding of the invention, the following examples are presented primarily for purposes of illustrating certain more specific details thereof. The scope of the invention is not to be deemed limited thereby, except as defined in the claims. Unless otherwise noted, the parts are by weight.

Example 1

To 40 parts by volume of anhydrous ether are added 1.9 parts of p-chlorobenzoyl chloro-oxime and 1.4 parts of thionyl aniline in a suitable reaction vessel. The reaction mixture is vigorously stirred. Thereafter, 1.4 parts by volume of triethyl amine in 5 parts by volume of anhydrous ether are added dropwise over a period of ninety minutes followed by continuous stirring for an additional twelve hours.

Resultant solution is next evaporated after filtering the triethyl amine hydrochloride salt formed during the reaction. Three parts of crude product are recovered and thereafter suspended in ethyl alcohol and filtered. The material so-filtered is further crystallized by dissolving the same in hot alcohol, concentrating the latter solution and cooling.

On infrared analysis, 2-oxo-3-phenyl-4-p-chlorophenyl-1,2,3,5-oxathiadiazole, having a melting point of 84° C. to 85° C., is identified and obtained in a yield of about 60% based on the theoretical. It is soluble in dimethylformamide, acetone and dioxane. On further analysis, the product analyses as:

Calculated: C, 55.33%; H, 3.10%; N, 9.57%. Found: C, 55.21%; H, 3.02%; N, 9.41%.

Example 2

The procedure of Example 1 is repeated in every detail, except that for thionyl aniline 1.5 parts of thionyl n-butyl amine are substituted. On infrared analysis, the product, 2-oxo-3-butyl-4-p-chlorophenyl - 1,2,3,5 - oxathiadiazole, which is a difficultly crystallizable oil, is identified and obtained in good yield. It is moreover soluble in most common organic solvents, such as ether, acetone and dioxane.

Example 3

The procedure of Example 1 is repeated in every detail, except that for the thionyl aniline 2.3 parts of thionyl dodecyl amine are substituted. On infrared analysis, the product, 2-oxo-3-dodecyl-4-p-chlorophenyl-1,2,3,5 - oxathiadiazole, soluble in acetone, ether and dimethylformamide, is identified and obtained in good yield. The product further analyses as:

Calculated: C, 59.28%; H, 7.59%; N, 7.28%. Found: C, 59.48%; H, 7.52%; N, 7.05%.

Example 4

To an ice-cooled solution of 50 parts of phenyl isocyanate, 15.7 parts of nitroethane and 29.3 parts of thionyl aniline in 50 parts by volume of dry ether is added triethylamine dropwise under agitation. Carbon dioxide begins to evolve slowly, while sym-diphenylurea precipitates in twenty minutes. Stirring is continued for one hour at room temperature before the reaction mixture is refluxed for one hour. After cooling, sym-diphenylurea is filtered off and the filtrate is evaporated to dryness. Crude product, 2-oxo-3-phenyl-4-methyl-1,2,3,5-oxathiadiazole is obtained in good yield and is identified by infrared analysis. The solid product is soluble in acetone and ether and melts below about 80° C.

Example 5

To a solution of 50 parts of phenyl isocyanate, 29 parts of phenyl nitromethane and 48.5 parts of thionyl dodecyl amine in 50 parts by volume of dry benzene at 25° C. is added dropwise tri-n-butylamine under agitation. Carbon dioxide evolves and sym-diphenylurea begins to precipitate in a few minutes. The reaction mixture is refluxed for one hour, then cooled and filtered. Filtrate is evaporated to dryness to recover 2-oxo-3-dodecyl-4-phenyl-1,2,3,5-oxathiadiazole, identified by infrared analysis. It melts below about 100° C. and is soluble in ether and acetone.

The compounds of the present invention possess fungicidal properties. The following example illustrates this utility.

*Example 6*

A standardized spore suspension is placed in a 50% water-acetone solution of each of the five test compounds prepared in the above examples at a concentration of about 100 parts per million. The spores employed are obtained from the species *Monolinia fructicola* and *Stemphylium sarcinaeforme*. The spore germination is recorded after twenty-four hours, incubation at 75° F. and 100% relative humidity. At that time, from 95% to 100% kill of the spores is noted.

I claim:

1. An oxathiadiazole of the formula:

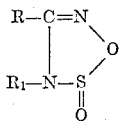

wherein R and $R_1$ are each a member selected from the class consisting of alkyl from 1 to 18 carbon atoms, phenyl, naphthyl, monohalophenyl.

2. The compound: 2-oxo-3-phenyl-4-chlorophenyl-1,2,3,5-oxathiadiazole.

3. The compound: 2-oxo-3-dodecyl-4-phenyl-1,2,3,5-oxathiadiazole.

4. The compound: 2-oxo-3-butyl-4-p-chlorophenyl-1,2,3,5-oxathiadiazole.

5. The compound: 2-oxo-3-dodecyl-4-p-chlorophenyl-1,2,3,5-oxathiadiazole.

6. The compound: 2-oxo-3-phenyl-4-methyl-1,2,3,5-oxathiadiazole.

7. The process for preparing a 1,2,3,5-oxathiadiazole of the formula:

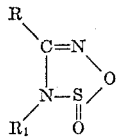

wherein R and $R_1$ are each a member selected from the class consisting of alkyl from 1 to 18 carbon atoms, phenyl, naphthyl, monohalophenyl, which comprises: reacting substantially equimolar proportions of a mononitrile oxide of the formula:

RCNO and a thionyl amine of the formula:

$R_1$NSO wherein R and $R_1$ are defined as above, and thereafter recovering so-formed 2-oxo-3,4-disubstituted 1,2,3,5-oxathiadiazole.

8. The process according to claim 7, wherein the thionyl amine is thionyl aniline.

9. The process according to claim 7, wherein the thionyl amine is thionyl dodecyl amine.

No references cited.